United States Patent [19]

Snodgrass

[11] Patent Number: 4,674,212

[45] Date of Patent: Jun. 23, 1987

[54] AUTOMATICALLY RETRACTING SAFETY SIGN

[76] Inventor: Gary B. Snodgrass, 9603 Norfolk St., Manassas, Va. 22110

[21] Appl. No.: 760,086

[22] Filed: Jul. 29, 1985

[51] Int. Cl.[4] ............................................. G09F 21/04
[52] U.S. Cl. .................................. 40/593; 40/601
[58] Field of Search .................... 40/593, 601, 617; 340/52 E, 124, 145; 280/801, 807

[56] References Cited

U.S. PATENT DOCUMENTS

| | | | |
|---|---|---|---|
| 1,894,684 | 1/1933 | Hawk | 40/593 |
| 2,512,515 | 6/1950 | Bauers | 40/601 |
| 2,591,494 | 4/1952 | Asachika | 40/601 |
| 2,706,806 | 4/1955 | Johnson | 40/593 |
| 2,985,869 | 5/1961 | Arrasmith | 340/213 |
| 3,074,055 | 1/1963 | Rudolph et al. | 340/52 E |
| 3,112,467 | 11/1963 | Benning | 340/52 E |
| 3,133,277 | 5/1964 | Hood | 340/52 E |
| 3,383,788 | 5/1968 | Patzer | 40/593 |
| 3,449,847 | 6/1969 | Howell | 40/601 |
| 3,938,269 | 2/1976 | Catteau | 40/601 |
| 4,299,043 | 11/1981 | Lathrop | 40/601 |

Primary Examiner—Robert P. Swiatek
Assistant Examiner—Cary E. Stone

[57] ABSTRACT

A rectangular seat belt warning sign is made that is automatically deployed or retracted by the action of a seat belt in an automobile or public transport. The sign, attached to a cord or cords, retracts by leverage over a fulcrum and out of sight when the seat belt, attached to the other end of the cord, is pulled over the wearer and secured. Conversely, when the seat belt is retracted into its holder, the warning sign drops back in view by gravity. Pictures and other messages can be affixed to the sign as the wearer chooses. The system provides a very positive manner in which a driver or passenger must wear a seat belt; is a no-noise device which stays deployed until the seat belt is worn.

3 Claims, 4 Drawing Figures

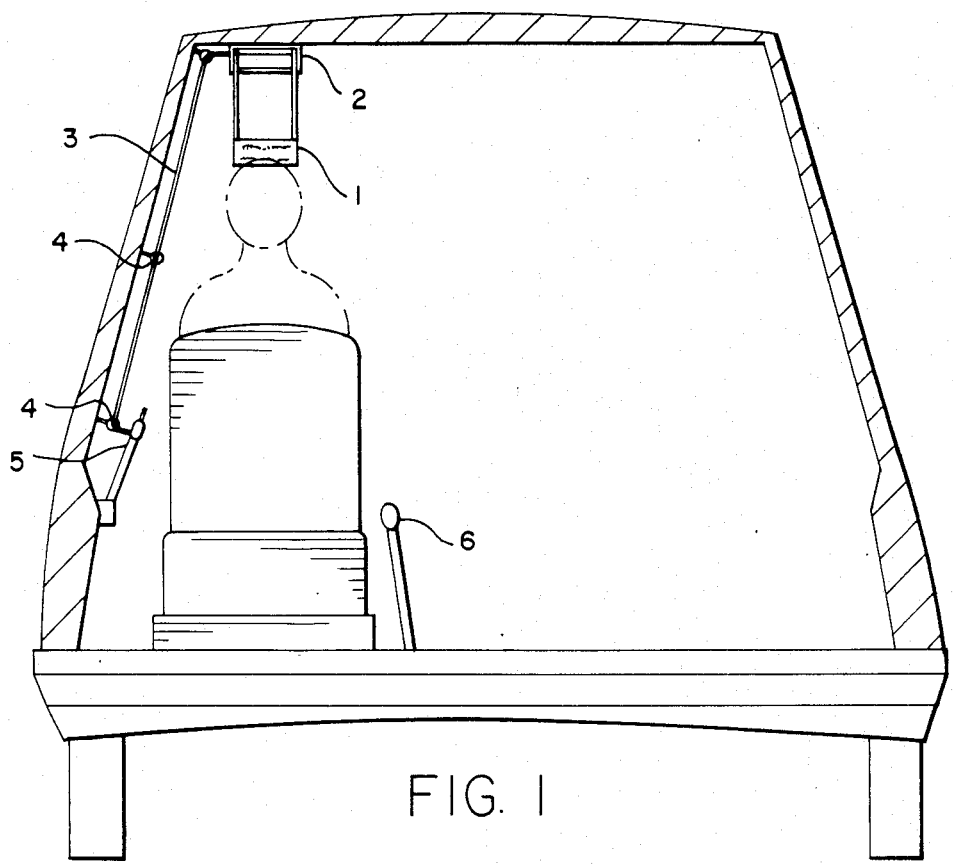
FIG. 1
FIG. 2
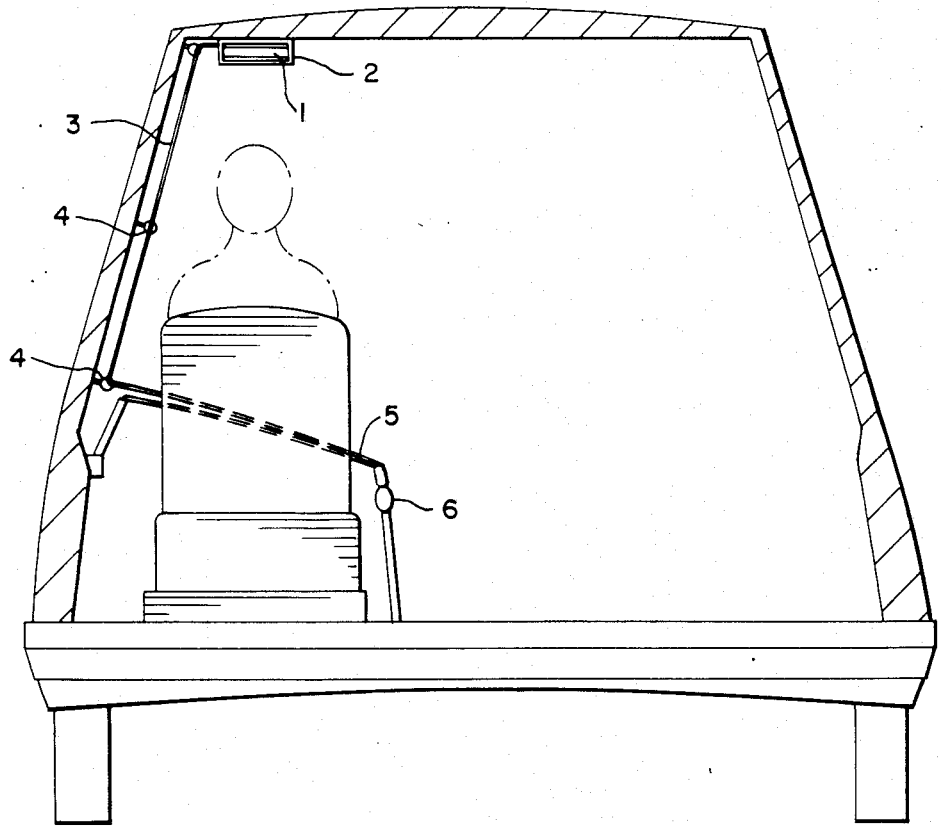

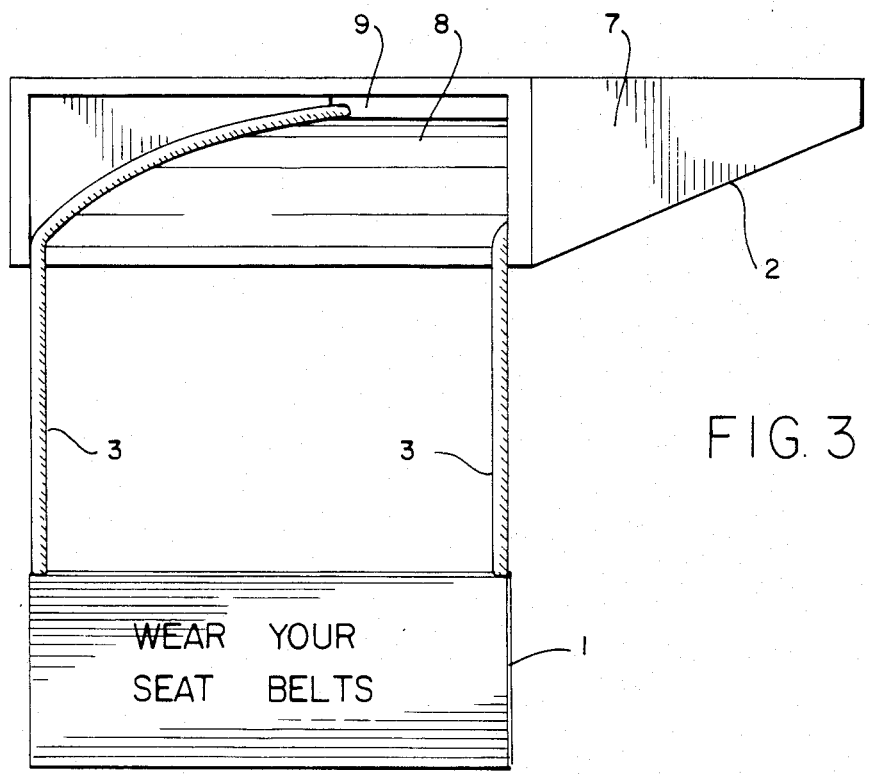
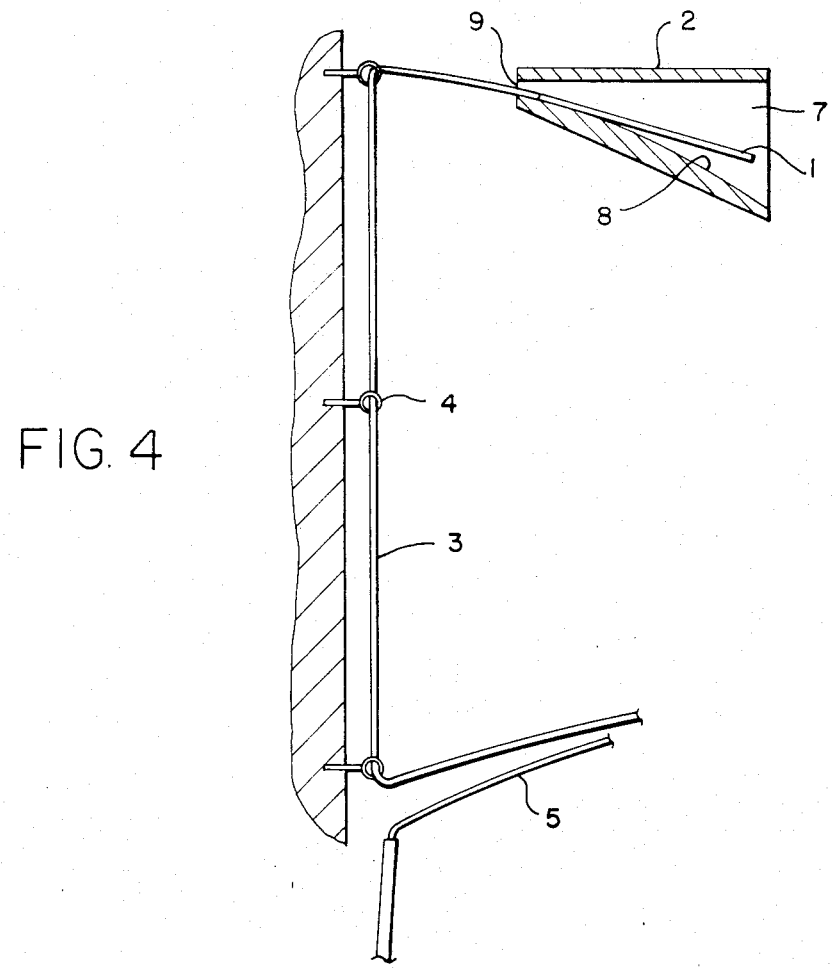

4,674,212

AUTOMATICALLY RETRACTING SAFETY SIGN

BACKGROUND OF THE INVENTION

1. Field of the Invention

This invention pertains to signs or sign display systems, particularly to signs that are deployed conveniently and automatically as warning signs or alerts in automobiles and other transports.

2. Discussion of the Art

Conventional safety or warning signs are generally of two types. Physical signage displays or electronic.

Physical signage systems are usually permanently fixed or deployed with complex pulley or gear systems. Electronic systems are activated electromagnetically and display a sign by means of lights or a buzzer.

U.S. Pat. No. 2,512,515 is a poster panel deployed by means of a pulley system.

U.S. Pat. No. 2,512,519 is a poster panel deployed by means of a pivotting arm system.

U.S. Pat. No. 3,449,847 is a sign which is raised or lowered by means of a sliding pole and strap mechanism.

U.S. Pat. No. 4,299,043 is a sign display system using a pulley as a means of deployment of the sign and sliding mechanisms for changing signs.

U.S. Pat. No. 2,591,494 is a sign board that is retractable or deployable using pulleys, drums and rollers.

U.S. Pat. No. 3,938,269 is a sign display system utilizing a roller drum and flexible fabric for "rolling out" the sign. These patents in subclass 601 are for sign display systems where a large sign is physically deployed because of its size and weight with wheels, pulleys or gears, with the exception of U.S. Pat. No. 3,938,269 which is a flexible sign deployed with a roller system.

U.S. patents in class 40, subclass 593, are also of interest.

U.S. Pat. No. 1,894,684 is a sign system utilizing a gear assembly and a projector for displaying messages to passengers on a conveyance.

U.S. Pat. No. 2,706,806 is a remainder sign utilizing a sliding mechanism and an electric circuit for illumination.

U.S. Pat. No. 2,985,869 is a warning apparatus which alerts a driver or pilot of a system malfunction when a circuit is broken by action of an electro-magnet. This device is a representative patent in class 340/subclass 213 in which reside many of the modern day electronic signal devices.

All available art appears to be for signs deployed with, as mentioned, complex gear or pulley systems or with sliding mechanisms of interchangeable letters.

There does not appear in the art any signs that can be automatically deployed by a seat belt wearer by mechanical means in a simple and inexpensive manner. More specifically, there does not appear in the art a sign system that utilizes a lever and fulcrum in conjunction with a sliding cord and a redeployment of the sign by gravity. There does not appear in the art a system which deploys a seat belt sign mechanically, as opposed to mechanical activation of an electromagnet or circuit by action of a seat belt.

SUMMARY

This invention is a system which deploys or retracts a seat belt sign by respectively retracting or wearing an automobile seat belt. The sign is deployed by gravity when the seat belt is not extended for use and retracts by means of a cord, eye bolts and a fulcrum box when the seat belt is worn. The cord is attached to the seat belt fabric, is guided through eye bolts and the sign either drops from the ceiling of the auto or retracts into the fulcrum box depending on the position of the seat belt. The sign can be affixed with messages or pictures as the driver chooses.

This system is not presently demonstrated by the prior art. Furthermore, there are no similarities to other systems for deploying signs. This system displays a number of features that are favorable to the safety of drivers and to the low cost of seat belt signs. The biggest single achievement of this device is that it provides a definite way to insure the wearing of seat belts. It is an effective way to make driving safe and avoid the need for the auto industry to install expensive systems and air bags.

BRIEF DESCRIPTION OF THE DRAWINGS

FIG. 1: Schematic drawing of the "Automatically Retracting Safety Sign" while the sign is displayed and the seat belt is not in use.

FIG. 2: Schematic drawing of the "Automatically Retracting Safety Sign" while seat belt is in use (is affixed over a person), and the sign is retracted.

FIG. 3: Front view of fulcrum box, two cords, and sign displayed (seat belt not in use).

FIG. 4: Side view of the fulcrum box, sign retracted into the fulcrum box, eye bolt and one cord.

DETAILED DESCRIPTION OF THE PREFERRED EMBODIMENT

FIG. 1: FIG. 1 is a schematic of the invention with the sign down. Item 1 shows the sign in a lowered (not retracted) position. Item 2 shows the fulcrum box and its position with respect to an automobile body, the ceiling on which it is affixed. Item 3 shows a cord, attached to the sign at one end and attached to the seat belt at the other end. Item 4 shows a number of eye bolts attached to the body of the automobile. Item 5 is a left positioned seat belt and item 6 is a seat belt buckle. The sign (1) moves into the fulcrum box (2) by virtue of movement of the cord (3) when the seat belt (5) moves over a passenger and is affixed at the seat buckle (6). The cord (3) moves by sliding through the eye bolts (4).

FIG. 2: Is a schematic of the device with the sign retracted, i.e., the seat belt is being worn. The sign (1) is retracted into the fulcrum box (2). The cord (3) has moved downward through the eye bolts (4). The seat belt (5) is attached at the seat belt buckle (6).

FIG. 3: Is a drawing of the fulcrum box with the seat belt sign deployed and attached to two cords. The fulcrum box housing (7) houses the fulcrum surface (8). An opening (9) at the rear of the fulcrum box allows passage of the cords (3). The cords (3) are attached to the sign (1) on each of two ends so that the sign will hang straight. Dimensions are such that the fulcrum box is not too obtrusive in private vehicles or public transports. The sign (1) is a proper size for adequate viewing and will fit perfectly in the fulcrum box.

FIG. 4: Is a side view of the fulcrum box with the sign attached to one cord (3) and retracted into the fulcrum box. The sign (1) has slid and moved by leverage over the fulcrum surface (8). The cord (3) has moved by sliding through the eyebolts (4). The cord (3) has moved in the direction of the seat belt (5).

What is claimed is:

1. An automatically retracting and deploying sign system designed for reminding automobile or other vehicle transport drivers or passengers to wear seat belts; the system comprising a rectangular sign, at least one cord having one end attached at the top end of the sign and attached to the seat belt at the opposite end of the cord, a fulcrum box and eyebolts through which the cord is guided;

said sign movable by the action or motion of said cord;

said sign moving out of sight when the seat belt is extended or in use;

said sign moving in view when the seat belt is retracted or not in use;

said fulcrum box comprising a housing and a fulcrum surface on which the sign moves;

said sign fully retractable into the fulcrum box over the fulcrum surface;

said fulcrum box attachable to the ceiling of an automobile or transport.

2. The sign system as described in claim 1:

said sign is deployable over the fulcrum surface, said sign system having the fulcrum surface as an integral part of the fulcrum box, the sign moving out of view by movement on the fulcrum surface.

3. A sign system as described in claim 1, wherein the sign is retracted or deployed over the fulcrum surface.

* * * * *